United States Patent
Yu

(10) Patent No.: US 9,657,829 B2
(45) Date of Patent: May 23, 2017

(54) PINION ASSEMBLY HAVING A BEARING SUPPORT SURFACE

(71) Applicant: ArvinMeritor Technology, LLC, Troy, MI (US)

(72) Inventor: Kenneth K. Yu, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 363 days.

(21) Appl. No.: 14/522,043

(22) Filed: Oct. 23, 2014

(65) Prior Publication Data

US 2016/0116048 A1   Apr. 28, 2016

(51) Int. Cl.

| | |
|---|---|
| *F16H 48/42* | (2012.01) |
| *F16H 55/02* | (2006.01) |
| *F16H 57/021* | (2012.01) |
| *F16H 57/037* | (2012.01) |
| *F16C 19/38* | (2006.01) |
| *F16C 33/58* | (2006.01) |
| *F16C 19/54* | (2006.01) |
| *F16C 19/26* | (2006.01) |
| *F16C 19/36* | (2006.01) |

(52) U.S. Cl.
CPC ............. *F16H 55/02* (2013.01); *F16C 19/38* (2013.01); *F16C 19/546* (2013.01); *F16C 33/581* (2013.01); *F16H 48/42* (2013.01); *F16H 57/021* (2013.01); *F16H 57/037* (2013.01); *F16C 19/26* (2013.01); *F16C 19/364* (2013.01); *F16C 2361/61* (2013.01); *F16H 2048/423* (2013.01)

(58) Field of Classification Search
CPC ........ F16C 19/38; F16C 19/546; F16C 19/26; F16H 55/02; F16H 48/42; F16H 57/021; F16H 57/037
See application file for complete search history.

(56) References Cited

U.S. PATENT DOCUMENTS

| | | | |
|---|---|---|---|
| 4,984,345 A | 1/1991 | Sawada et al. | |
| 5,228,366 A * | 7/1993 | Thoma | B60K 17/105 180/300 |
| 5,489,156 A | 2/1996 | Martinie | |
| 6,544,140 B2 | 4/2003 | Gradu et al. | |
| 2007/0032331 A1 | 2/2007 | Green et al. | |
| 2010/0080498 A1 | 4/2010 | Tamura et al. | |
| 2014/0137683 A1 | 5/2014 | Hayes et al. | |

(Continued)

FOREIGN PATENT DOCUMENTS

| | | |
|---|---|---|
| DE | 19925353 C1 | 3/2000 |
| DE | 102008039476 A1 | 2/2010 |

(Continued)

OTHER PUBLICATIONS

Timken, Wind Energy, The Timken Company, Copyright 2004.

(Continued)

*Primary Examiner* — David M Fenstermacher
(74) *Attorney, Agent, or Firm* — Brooks Kushman P.C.

(57) ABSTRACT

A pinion assembly having a pinion and at least one bearing unit. The bearing unit may have a set of bearing elements and an outer race. The bearing elements may be rotatably disposed on a bearing surface of the pinion such that the bearing elements may be disposed between and may engage the bearing surface and the outer race.

20 Claims, 4 Drawing Sheets

(56) References Cited

U.S. PATENT DOCUMENTS

| | | | | |
|---|---|---|---|---|
| 2014/0187374 A1* | 7/2014 | Murakami | ............ | F16C 33/6674 475/160 |
| 2015/0101435 A1* | 4/2015 | Asano | ........................ | F16H 1/12 74/416 |
| 2016/0116048 A1* | 4/2016 | Yu | .......................... | F16C 33/581 74/434 |

FOREIGN PATENT DOCUMENTS

| EP | 2023009 A1 | 2/2009 |
|---|---|---|
| JP | 2010286011 | 12/2010 |
| WO | 2011037640 A1 | 3/2011 |

OTHER PUBLICATIONS

European Patent Office, Extended European Search Report for the corresponding European Patent Application No. 15180297.2 dated Feb. 24, 2016.

\* cited by examiner

PINION ASSEMBLY HAVING A BEARING SUPPORT SURFACE

TECHNICAL FIELD

This patent application relates to a pinion assembly that may have a bearing support surface that may engage and support rotatable bearing elements.

BACKGROUND

A pinion gear assembly is disclosed in U.S. patent publication no. 2014/0137683.

SUMMARY

In at least one embodiment, a pinion assembly is provided. The pinion assembly may include a pinion and a first bearing unit. The pinion may have a gear portion and a shaft. The gear portion may have a set of teeth arranged around an axis. The shaft may extend from the gear portion and may have a first bearing support. The first bearing support may have a first bearing surface that may extend around the axis and may be disposed at an angle with respect to the axis. The first bearing unit may include a first set of bearing elements and a first outer race. The first set of bearing elements may be rotatably disposed on the first bearing surface. The first outer race may extend around the first bearing support and may receive the first set of bearing elements such that the first set of bearing elements may be disposed between and may engage the first bearing surface and the first outer race.

In at least one embodiment, a pinion assembly is provided. The pinion assembly may include a pinion and a spigot bearing unit. The pinion may have a gear portion, a shaft, and a spigot portion. The gear portion may have a set of teeth that may be arranged around an axis. The shaft may extend from the gear portion along the axis. The spigot portion may extend along the axis such that the spigot portion is disposed opposite the shaft and extends from the gear portion to a spigot end surface. The spigot portion may have a spigot bearing surface that may be disposed between the spigot end surface and the gear portion. The spigot bearing unit may include a set of roller bearing elements and a spigot outer race. The set of roller bearing elements may be rotatably disposed on the spigot bearing surface. The spigot bearing outer race may receive the set of roller bearing elements such that the set of roller bearing elements may be disposed between and may engage the spigot bearing surface and the spigot bearing outer race.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
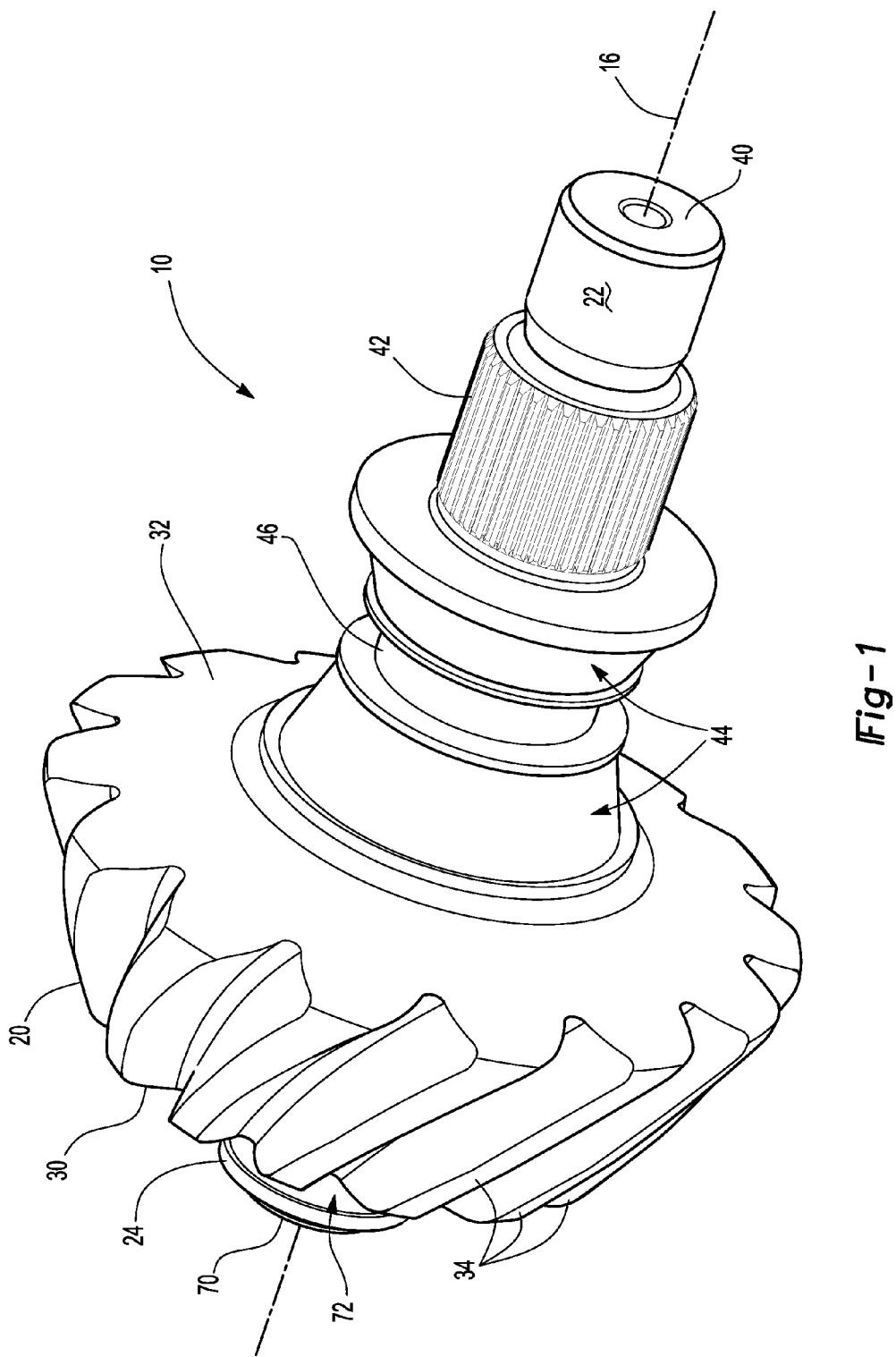
FIG. 1 is a perspective view of an exemplary pinion that may be provided with a pinion gear assembly.
Figure 2:
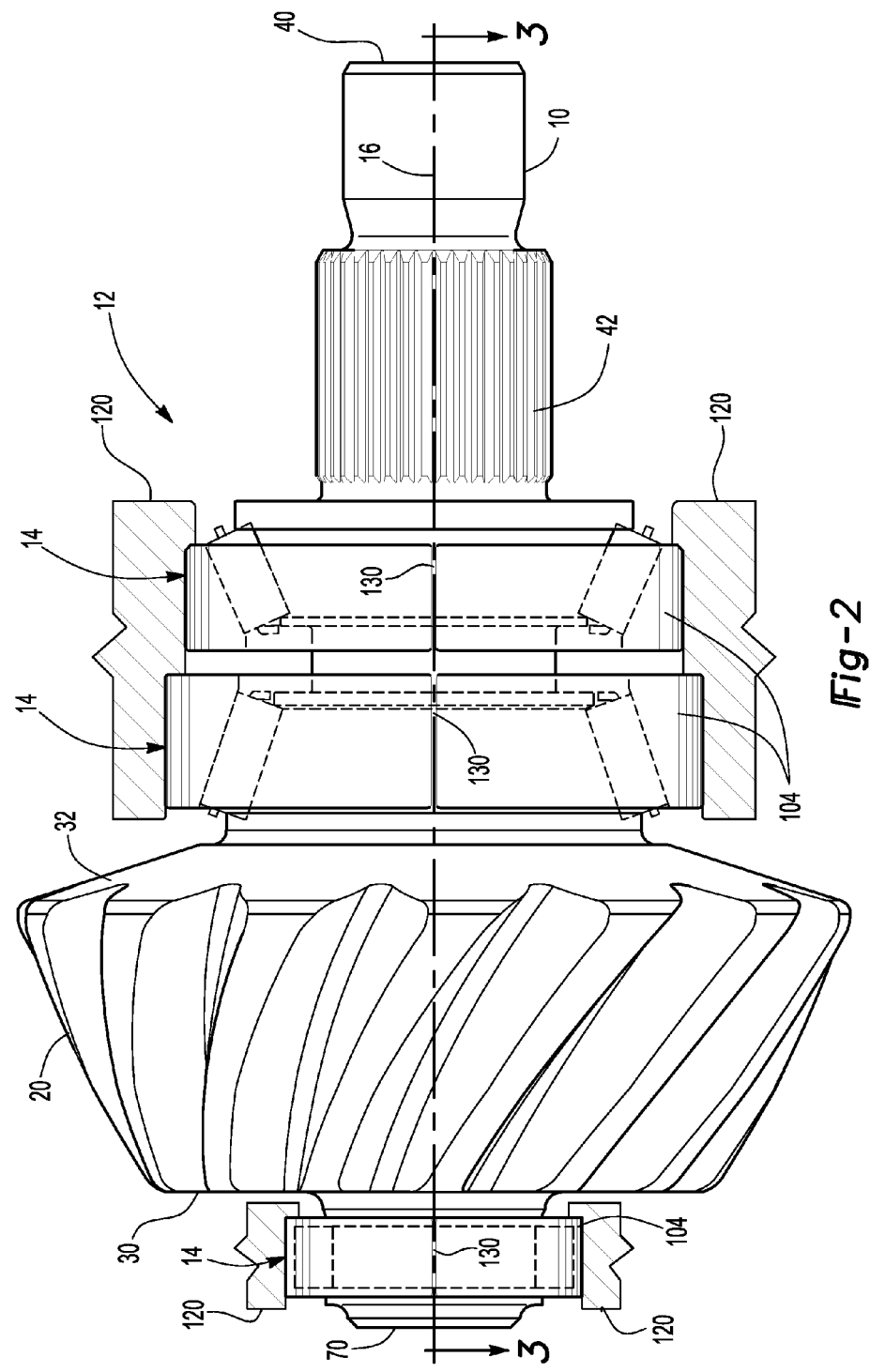
FIG. 2 is a side view of a pinion gear assembly.

Referring to FIGS. 1 and 2, an exemplary pinion 10 is shown. The pinion 10 may be part of a pinion assembly 12 that may include one or more bearing units 14 that may rotatably support the pinion 10 and allow the pinion 10 to rotate about an axis 16.

The pinion assembly 12 may be configured for use in a vehicle, such as a motor vehicle like a truck, bus, farm equipment, or cargo loading equipment for land, air, or marine vessels. For example, the pinion assembly 12 may be part of an axle assembly or differential that may be configured to transmit torque to vehicle traction wheel assemblies and may permit the traction wheel assemblies to rotate at different velocities. The pinion assembly 12 may be coupled to a torque source, such as a vehicle drivetrain component like a motor. Torque that is provided to the pinion 10 may be transmitted to another component, such as a ring gear. Torque may be transmitted from the ring gear to at least one axle and from an axle to at least one corresponding wheel hub and/or traction wheel assembly.

Referring to FIG. 1, the pinion 10 may have a gear portion 20, a shaft 22, and optionally a spigot portion 24. The gear portion 20, shaft 22, and spigot portion 24 may extend along and may be centered about the axis 16. The pinion 10 may have a unitary or one piece construction in which the gear portion 20, shaft 22, and spigot portion 24 are integrally formed. All or some of the pinion 10 may be heat treated or hardened to help withstand wear. In addition, the pinion 10 may be made of any suitable material, such as a metal alloy.

The gear portion 20 may extend outwardly from the axis 16 and may include a first gear portion end surface 30, a second gear portion end surface 32, and a set of teeth 34.

The first gear portion end surface 30 may be disposed opposite the shaft 22. In addition, the first gear portion end surface 30 may be disposed proximate or may extend from the spigot portion 24, if provided.

The second gear portion end surface 32 may be disposed opposite the first gear portion end surface 30. In addition, the second gear portion end surface 32 may be disposed proximate or may extend from the shaft 22.

The set of teeth 34 may extend between the first gear portion end surface 30 and the second gear portion end surface 32. The set of teeth 34 may be arranged around the axis 16 and may be provided in a repeating pattern. In at least one embodiment, the teeth 34 may be configured as hypoid gear teeth or bevel gear teeth, such as may be provided with a plain bevel gear or a spiral bevel gear. As such, the gear portion 20 may have a generally tapered or truncated conical shape that may become narrower (i.e., may be disposed closer to the axis 16) in direction that extends away from the shaft 22 or in a direction that extends from the second gear portion end surface 32 toward the first gear portion end surface 30 (e.g., to the left in FIG. 1).

The shaft 22 may extend from the gear portion 20. More specifically, the shaft 22 may extend along the axis 16 and away from second gear portion end surface 32 of the gear portion 20. In at least one embodiment, the shaft 22 may include a shaft end surface 40, a spline 42, one or more bearings supports 44, and a connecting surface 46.

The shaft end surface 40 may be disposed at an end of the shaft 22. As such, the shaft end surface 40 may be disposed opposite the gear portion 20 or opposite the spigot portion 24, if provided.

The spline 42 may be provided on an exterior surface of the shaft 22 and may be arranged around the axis 16. The spline 42 may mate with a corresponding spline that may be provided with another component, such as a yoke or input shaft, which may be coupled to a torque source and may provide torque to the shaft 22. In at least one embodiment, the spline 42 may be disposed between the shaft end surface 40 and a bearing support 44.

One or more bearings supports 44 may be provided with the shaft 22. The bearing supports 44 may be integrally formed with the pinion 10, thereby providing a unitary or one piece construction. In the figures, two bearing supports 44 are shown, although it is contemplated that one bearing support 44 or both bearing supports 44 may be deleted in one or more embodiments. The bearing supports 44 may have similar configurations. For instance, the bearing supports 44 may be generally configured as mirror images of each other in one or more embodiments. As such, common reference numbers are used to denote features of both bearing supports 44.

For clarity in reference, the bearing support 44 that is disposed closest to the gear portion 20 may be referred to as an inner bearing support 44 while the bearing support that is disposed proximate the spline 42 may be referred to as an outer bearing support 44. The inner bearing support 44 may extend from the gear portion 20. For example, the inner bearing support may extend from the second gear portion end surface 32. The outer bearing support 44 may be completely spaced apart from the gear portion 20 and/or the inner bearing support 44 and may be disposed between the gear portion 20 and the shaft end surface 40. In addition, the outer bearing support 44 may be disposed between the inner bearing support 44 and the spline 42 in configurations having inner and outer bearing supports. The inner bearing support 44 and/or the outer bearing support 44 may be omitted in one or more embodiments.

Figure 3:
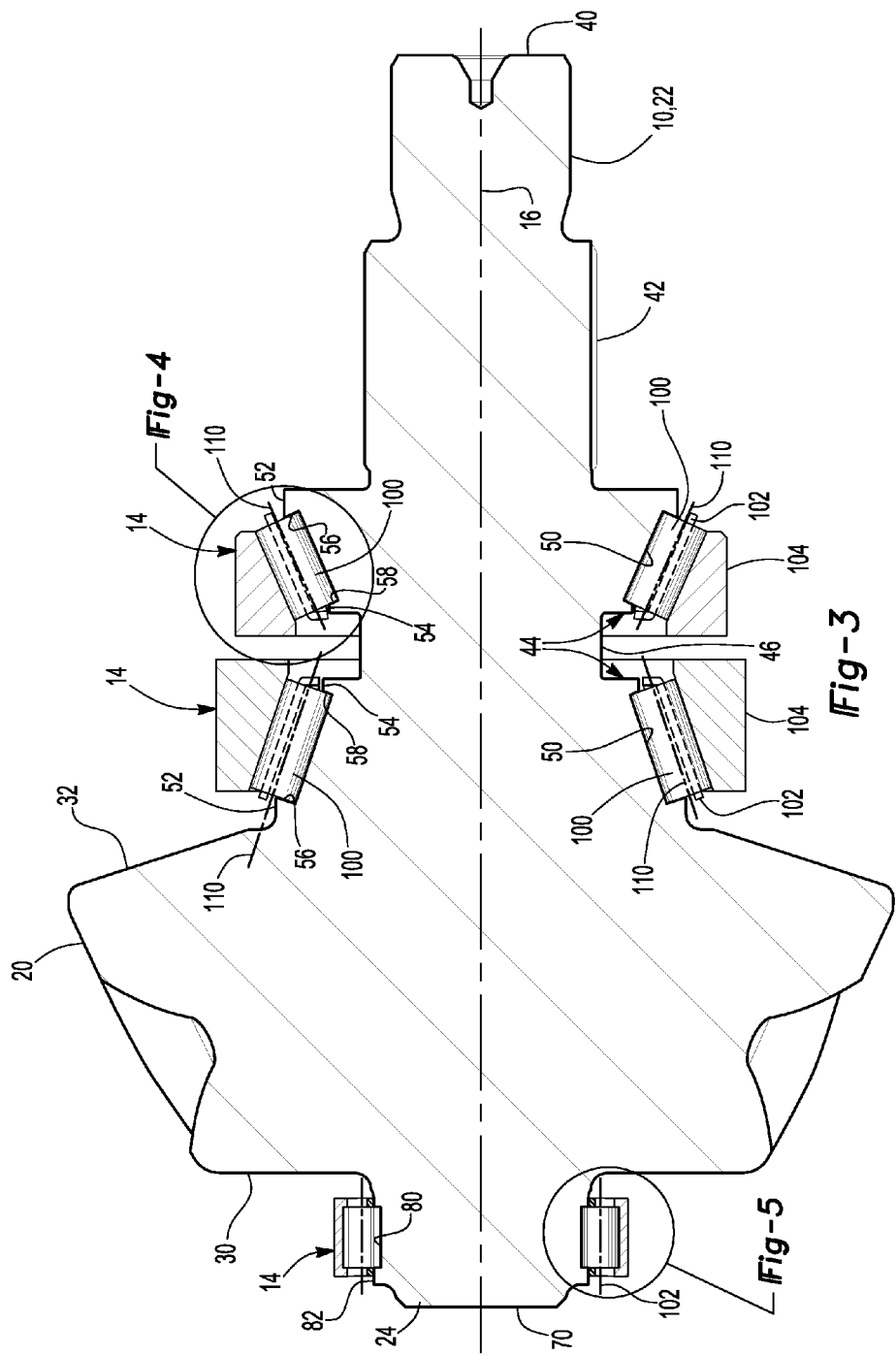
FIG. 3 is a section of the pinion gear assembly along section line 3-3 in FIG. 2.
Figure 4:
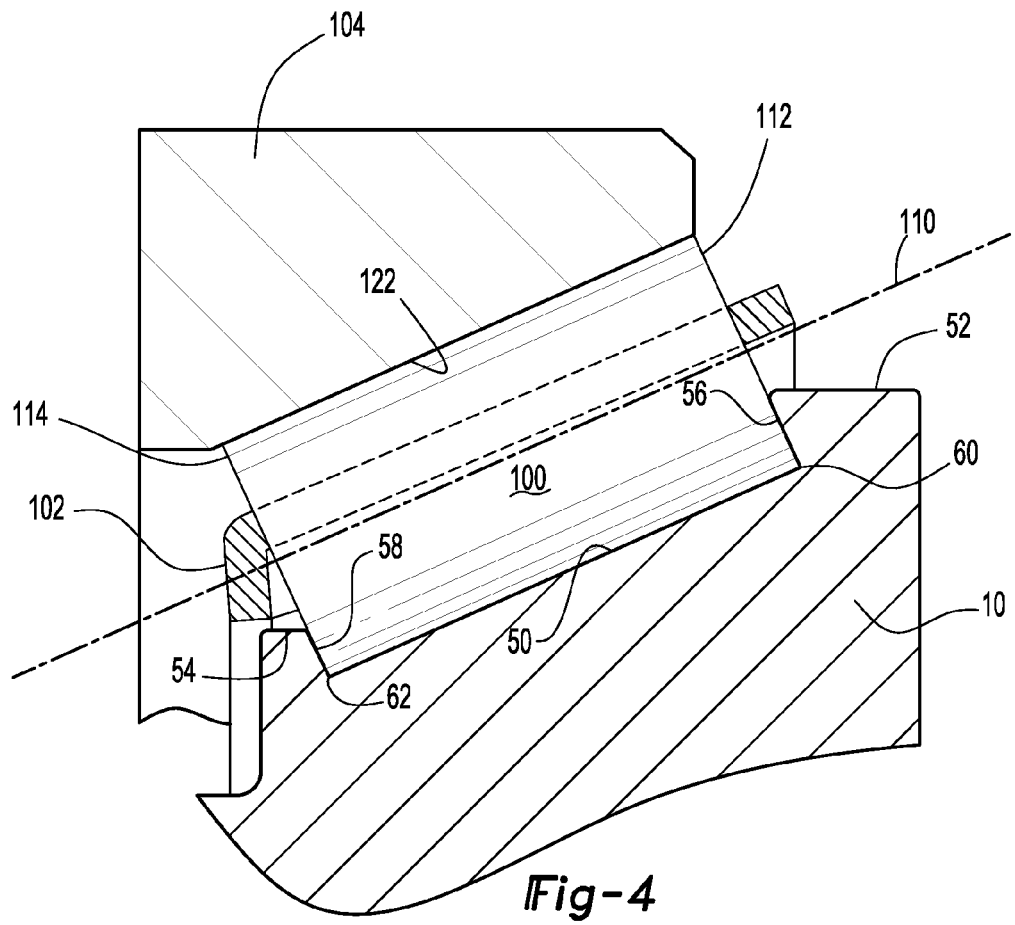
FIGS. 4 and 5 are magnified views of portions of the pinion gear assembly in FIG. 3.

The bearing support 44 may be configured to directly engage and support bearing elements, such as roller bearings, that may rotatably support the pinion 10 as will be discussed in more detail below. As such, an inner race may not be disposed between the bearing elements and the bearing support 44. As is best shown in FIGS. 3 and 4, the bearing support 44 may include a bearing surface 50, a first outer surface 52, a second outer surface 54, a first step surface 56, and a second step surface 58.

The bearing surface 50 may extend continuously around the axis 16. In addition, the bearing surface 50 may have a first end 60 and a second end 62 that may be disposed opposite the first end 60. The bearing surface 50 may engage and support bearing elements that may rotate upon the bearing surface 50 and/or around the axis 16. The bearing surface 50 may be recessed into the bearing support 44 to help position and align the bearing elements as will be discussed in more detail below. The bearing surface 50 may have a generally tapered or truncated conical shape and may be disposed at an angle with respect to the axis 16. As such, the bearing surface 50 may not be disposed substantially parallel to the axis 16 or substantially perpendicular to the axis 16 in one or more embodiments. As is best shown in FIG. 3, the bearing surface 50 of the inner bearing support 44 may be disposed at an angle such that the bearing surface 50 may extend toward the axis 16 or become progressively closer to the axis 16 in a first direction that extends away from the gear portion 20 and toward the shaft end surface 40. The bearing surface 50 of the outer bearing support 44 may be disposed at an angle such that the bearing surface 50 may extend toward the axis 16 or become progressively closer to the axis 16 in a second direction that extends toward the gear portion 20 and away from the shaft end surface 40. As such, the angled bearing surfaces 50 may cooperate to help inhibit axial movement of the pinion 10.

The first outer surface 52 may extend around the axis 16 and may be spaced apart from the bearing surface 50. The first outer surface 52 may be disposed substantially parallel to the axis 16 in one or more embodiments. In addition, the first outer surface 52 may be disposed further from the axis 16 than the bearing surface 50 and the second outer surface 54. As is best shown in FIG. 3, the first outer surface 52 of the inner bearing support 44 may extend from the second gear portion end surface 32 to the first step surface 56.

The second outer surface 54 may also extend around the axis 16 and may be spaced apart from the bearing surface 50. The second outer surface 54 may be disposed substantially parallel to the axis 16 and/or the first outer surface 52 in one or more embodiments. In addition, the second outer surface 54 may be disposed closer to the axis 16 than the first outer surface 52. The second outer surface 54 may be completely spaced apart from the first outer surface 52.

The first step surface 56 may extend around the axis 16 and may extend from the bearing surface 50 to the first outer surface 52. More specifically, the first step surface 56 may extend from an end of the first outer surface 52 to the first end 60 of the bearing surface 50. The first step surface 56 may be disposed substantially perpendicular to the bearing surface 50, but may not be disposed substantially perpendicular to the axis 16 and/or the first outer surface 52 in one or more embodiments. As such, the first step surface 56 may be disposed at an angle relative to the axis 16. In addition, the first step surface 56 may be disposed further from the axis 16 than the second step surface 58.

The second step surface 58 may extend around the axis 16 and may extend from the bearing surface 50 to the second outer surface 54. More specifically, the second step surface 58 may extend from an end of the second outer surface 54 to the second end 62 of the bearing surface 50. The second step surface 58 may be spaced apart from the first step surface 56. In addition, the second step surface 58 may be disposed substantially parallel to the first step surface 56 in one or more embodiments. The second step surface 58 may be disposed substantially perpendicular to the bearing surface 50, but may not be disposed substantially perpendicular to the axis 16 and/or the second outer surface 54 in one or more embodiments.

The connecting surface 46 may extend between the inner bearing support 44 and the outer bearing support 44 in configurations that have both inner and outer bearing supports 44. The connecting surface 46 may be disposed closer to the axis 16 than the bearing surfaces 50 of the inner and/or outer bearing supports 44. In addition, the connecting surface 46 may help separate bearing units 14 that may be mounted on the inner and outer bearing supports 44.

Figure 5:
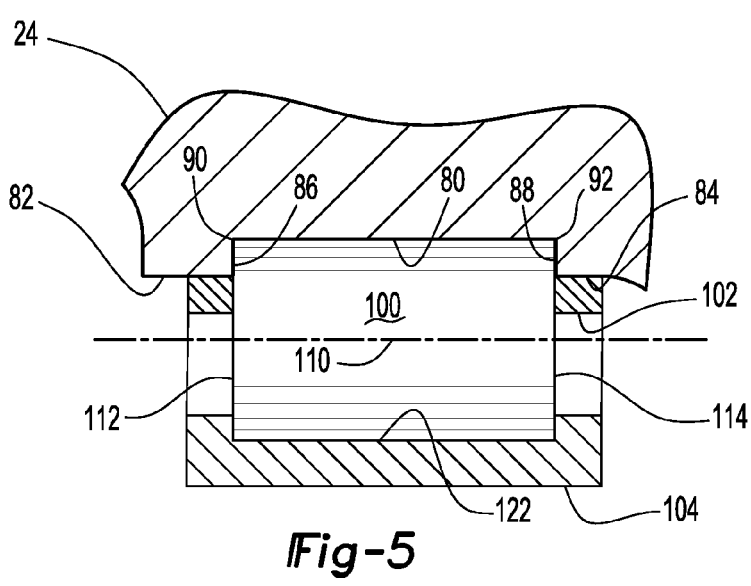

Referring to FIGS. 1, 3 and 5, the spigot portion 24, if provided, may extend from the gear portion 20 and may be disposed opposite the shaft 22. More specifically, the spigot portion 24 may extend along the axis 16 and away from the first gear portion end surface 30 of the gear portion 20. In at least one embodiment, the spigot portion 24 may include a spigot end surface 70 and a spigot bearing support 72.

The spigot end surface 70 may be disposed at an end of the spigot portion 24. As such, the spigot end surface 70 may be disposed opposite the shaft end surface 40 and the spigot portion 24 may extend from the gear portion 20 to the spigot end surface 70.

The spigot bearing support 72 may be configured to directly engage and support bearing elements, such as roller bearings, that may rotatably support the pinion 10 as will be discussed in more detail below. In at least one embodiment, the spigot bearing support 72 may include a spigot bearing surface 80, a first spigot outer surface 82, a second spigot outer surface 84, a first spigot step surface 86, and a second spigot step surface 88.

The spigot bearing surface 80 may extend continuously around the axis 16. Moreover, the spigot bearing surface 80 may be disposed between the spigot end surface 70 and the gear portion 20. In addition, the spigot bearing surface 80 may have a first end 90 and a second end 92 that may be disposed opposite the first end 90. The spigot bearing surface 80 may engage and support bearing elements that may rotate upon the spigot bearing surface 80 and/or around the axis 16. The spigot bearing surface 80 may be recessed into the spigot bearing support 72 to help position and align the bearing elements as will be discussed in more detail below. As such, the spigot bearing surface 80 may be disposed closer to the axis 16 than the first spigot outer surface 82, second spigot outer surface 84, first spigot step surface 86, and the second spigot step surface 88. The spigot bearing surface 80 may be disposed substantially parallel to the axis 16 in one or more embodiments.

The first spigot outer surface 82 may be disposed proximate the spigot end surface 70. The first spigot outer surface 82 may extend around the axis 16 and may be spaced apart from the spigot bearing surface 80. The first spigot outer surface 82 may be disposed substantially parallel to the axis 16 in one or more embodiments. In addition, the first spigot outer surface 82 may be disposed further from the axis 16 than the spigot bearing surface 80.

The second spigot outer surface 84 may also extend around the axis 16 and may be spaced apart from the spigot bearing surface 80. The second spigot outer surface 84 may be completely spaced apart from the first spigot outer surface 82. The second spigot outer surface 84 may be disposed substantially parallel to the axis 16 and/or the first spigot outer surface 82 in one or more embodiments. In addition, the second spigot outer surface 84 may be disposed closer to the gear portion 20 than the first spigot outer surface 82. For example, the second spigot outer surface 84 may be disposed proximate or may extend from the first gear portion end surface 30.

The first spigot step surface 86 may extend around the axis 16 and may extend from the spigot bearing surface 80 to the first spigot outer surface 82. More specifically, the first spigot step surface 86 may extend from an end of the first spigot outer surface 82 to the first end 90 of the spigot bearing surface 80. The first spigot step surface 86 may be disposed substantially perpendicular to the spigot bearing surface 80 and/or the first spigot outer surface 82 in one or more embodiments. As such, the first spigot step surface 86 may be disposed substantially perpendicular to the axis 16. In addition, the first spigot step surface 86 and the second spigot step surface 88 may be disposed at a similar or common distance from the axis 16.

The second spigot step surface 88 may extend around the axis 16 and may extend from the spigot bearing surface 80 to the second spigot outer surface 84. More specifically, the second spigot step surface 88 may extend from an end of the second spigot outer surface 84 to the second end 92 of the spigot bearing surface 80. The second spigot step surface 88 may be spaced apart from the first spigot step surface 86. In addition, the second spigot step surface 88 may be disposed substantially parallel to the first spigot step surface 86 in one or more embodiments. The second spigot step surface 88 may be disposed substantially perpendicular to the spigot bearing surface 80 and/or the second spigot outer surface 84 in one or more embodiments.

Referring to FIGS. 2 and 3, a bearing unit 14 may be provided with a bearing support 44 and the spigot bearing support 72. For clarity, the term bearing unit may be used to generically reference a bearing unit that may be provided with the inner bearing support 44, outer bearing support 44, and/or the spigot bearing support 72. A bearing unit 14 may be referred to as a spigot bearing unit when specifically associated with the spigot bearing support 72.

The bearing unit 14 may include a set of bearing elements 100, a cage 102, and an outer race 104.

The set of bearing elements 100 may be rotatably disposed on the bearing surface 50 and/or spigot bearing surface 80. The members of the set of bearing elements 100 may have any suitable configuration. For example, each bearing element 100 may be configured as a roller bearing that may rotate about a bearing element axis 110. In one or more embodiments, a bearing element 100 may have a substantially cylindrical configuration that may include a first end surface 112 and a second end surface 114.

As is best shown in FIG. 4, the first end surface 112 may be disposed opposite the second end surface 114. In addition, the first end surface 112 and the second end surface 114 may extend substantially perpendicular to the bearing element axis 110 in one or more embodiments. The first end surface 112 may be disposed proximate and may engage the first step surface 56. The second end surface 114 may be disposed proximate and may engage the second step surface 58. As such, the first step surface 56 and the second step surface 58 may cooperate to help limit or inhibit axial movement of each bearing element 100 along its bearing element axis 110 and may help retain each bearing element 100 in the bearing support 44. As is best shown in FIG. 5, the first end surface 112 may be disposed proximate and may engage the first spigot step surface 86 and the second end surface 114 may be disposed proximate and may engage the second spigot step surface 88 to help limit or inhibit axial movement of each bearing element 100.

The cage 102, which may also be called a retainer or separator, may separate and position the bearing elements 100 at substantially equal intervals. For example, the cage 102 may include a plurality of openings that may be arranged around the axis 16. Each opening may receive a corresponding bearing element 100. The cage 102 may be configured to hold or retain the bearing elements 100 such that the bearing elements 100 may rotate about their respective bearing element axes 110. In addition, the cage 102 may help secure or position the bearing elements 100 to facilitate installation of the cage 102 and bearing elements 100 onto a corresponding bearing support 44, 72 in one or more embodiments. The cage 102 may rotate about the axis 16 with respect to the outer race 104 in one or more embodiments.

The outer race 104 may extend around the bearing support 44. For example, the outer race 104 may be configured as a ring that may extend continuously around the axis 16 and the bearing elements 100. The outer race 104 may receive the set of bearing elements 100 such that the set of bearing elements 100 may be disposed between and may engage the bearing surface 50 and the outer race 104 as is best shown in FIG. 4 or may be disposed between and may engage the spigot bearing surface 80 and the outer race 104 as is best shown in FIG. 5. The outer race 104 may also be referred to as a spigot outer race 104 when used to reference an outer race that is disposed on a spigot bearing unit 14. As is best shown in FIG. 2, the outer race 104 may be fixedly disposed on a housing 120 or fixedly positioned with respect to a housing 120. As such, the outer race 104 may remain stationary and the bearing elements 100 may rotate along an outer race bearing surface 122.

The bearing unit 14 may be installed in any suitable manner. For example, the bearing unit 14 may be press fit onto a corresponding bearing support. Alternatively, the bearing unit 14 may be configured as a split bearing in which the cage 102 and outer race 104 may be split into separate portions or subassemblies, such as two separate portions or subassemblies that may be disposed opposite each other and may each extend approximately 180° about the axis 16. As is best shown in FIG. 2, the portions or subassemblies may be disposed proximate each other or may engage each other at a split line 130. A split bearing may be employed when the inner and/or outer bearing supports 44 or spigot bearing support 72 may interfere with press fit installation.

The pinion and bearing unit configurations described above may allow a pinion to be directly supported by rotatable bearing elements and may allow a bearing to be provided without an inner race that may otherwise be disposed between the pinion and the bearing elements, thereby reducing cost and weight. In addition, the pinion or surfaces such as the bearing support surfaces may be hardened to provide similar performance characteristics as an inner race to help provide sufficient durability and product life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pinion assembly comprising:
    a pinion that includes:
        a gear portion having a set of teeth arranged around an axis; and
        a shaft that extends from the gear portion, the shaft defining a first bearing surface that extends continuously around the axis and is disposed at an angle with respect to the axis; and
    a first bearing unit that includes:
        a first set of bearing elements that are rotatably disposed on the first bearing surface; and
        a first outer race that extends around the first bearing surface and receives the first set of bearing elements such that the first set of bearing elements is disposed between and engages the first bearing surface and the first outer race.

2. The pinion assembly of claim 1 wherein the first bearing surface is defined by a first bearing support of the shaft that extends from the gear portion.

3. The pinion assembly of claim 1 wherein the shaft has a shaft end surface and a first bearing support that is spaced apart from the gear portion and disposed between the gear portion and the shaft end surface.

4. The pinion assembly of claim 1 wherein the shaft has a first bearing support that includes a first outer surface that extends around the axis, a second outer surface that extends around the axis and is disposed closer to the axis than the first outer surface, a first step surface that extends from the first outer surface to a first end of the first bearing surface, and a second step surface that extends from the second outer surface to a second end of the first bearing surface.

5. The pinion assembly of claim 4 wherein each member of the first set of bearing elements has a first end surface disposed proximate the first step surface and a second end surface that is disposed opposite the first end surface and is disposed proximate the second step surface.

6. The pinion assembly of claim 4 wherein the first step surface is disposed further from the axis than the second step surface.

7. The pinion assembly of claim 4 wherein the first outer surface is disposed further from the axis than the second outer surface and the first bearing surface.

8. The pinion assembly of claim 7 wherein the first outer surface extends from the gear portion to the first step surface.

9. The pinion assembly of claim 4 wherein the first outer surface and the second outer surface are disposed substantially parallel to the axis and the first step surface and the second step surface are disposed substantially parallel to each other and are not disposed substantially perpendicular to the first outer surface, the second outer surface, and the axis.

10. The pinion assembly of claim 1 wherein the shaft further comprises a second bearing support that is spaced apart from a first bearing support of the shaft that includes the first bearing surface, wherein the second bearing support includes a second bearing surface that extends continuously around the axis, a first outer surface that extends around the axis, a second outer surface that extends around the axis and is disposed closer to the axis than the first outer surface, a first step surface that extends from the first outer surface to a first end of the second bearing surface, and a second step surface that extends from the second outer surface to a second end of the second bearing surface; and
    wherein a second bearing unit is disposed on the second bearing support and includes a second set of bearing elements that are disposed on the second bearing surface and a second outer race that receives the second set of bearing elements such that the second set of bearing elements is disposed between and engages the second bearing surface and the second outer race.

11. The pinion assembly of claim 10 wherein the first bearing surface extends toward the axis in a first direction that extends away from the gear portion and the second bearing surface extends toward the axis in a second direction that extends toward the gear portion.

12. The pinion assembly of claim 10 wherein the shaft has a connecting surface that is disposed between the first bearing support and the second bearing support, wherein the connecting surface is disposed closer to the axis than the first bearing surface and the second bearing surface.

13. The pinion assembly of claim 10 wherein the pinion includes a spigot portion that extends along the axis from the gear portion to a spigot end surface, wherein the spigot portion includes a spigot bearing surface that is disposed between the spigot end surface and the gear portion, and wherein the pinion assembly further comprises a spigot bearing unit that includes a set of roller bearing elements that are rotatably disposed on the spigot bearing surface, and a spigot bearing outer race that receives the set of roller bearing elements such that the set of roller bearing elements is disposed between the spigot bearing surface and the spigot bearing outer race.

14. The pinion assembly of claim 13 wherein the spigot portion further comprises a first spigot outer surface that is disposed proximate the spigot end surface, a second spigot outer surface disposed proximate the gear portion, a first spigot step surface that extends from the first spigot outer surface to the spigot bearing surface, and a second spigot step surface that extends from the second spigot outer surface to the spigot bearing surface.

15. The pinion assembly of claim 14 wherein each member of the set of roller bearing elements has a first end surface disposed proximate the first spigot step surface and a second end surface that is disposed opposite the first end and is disposed proximate the second spigot step surface.

16. The pinion assembly of claim 15 wherein the spigot bearing surface is disposed closer to the axis than the first spigot step surface and the second spigot step surface such that the first and second spigot step surfaces cooperate to inhibit axial movement of the set of roller bearing elements.

17. A pinion assembly comprising:
a pinion that includes:
a gear portion having a set of teeth arranged around an axis;
a shaft that extends from the gear portion along the axis; and
a spigot portion that extends along the axis such that the spigot portion is disposed opposite the shaft and extends from the gear portion to a spigot end surface, wherein the spigot portion defines a spigot bearing surface disposed between the spigot end surface and the gear portion; and
a spigot bearing unit that includes:
a set of roller bearing elements that is rotatably disposed on the spigot bearing surface; and
a spigot bearing outer race that receives the set of roller bearing elements such that the set of roller bearing elements is disposed between and engages the spigot bearing surface and the spigot bearing outer race.

18. The pinion assembly of claim 17 wherein the shaft further comprises a first bearing support that includes a first bearing surface that extends continuously around the axis and is disposed at an angle with respect to the axis, and the pinion assembly further comprises a first bearing unit that includes a first set of bearing elements that are rotatably disposed on the first bearing surface and a first outer race that receives the first set of bearing elements such that the first set of bearing elements is disposed between and engages the first bearing surface and the first outer race.

19. The pinion assembly of claim 18 wherein the first bearing support is spaced apart from the gear portion.

20. The pinion assembly of claim 18 wherein the first bearing support extends from the gear portion.

* * * * *